United States Patent
Nuebling et al.

(10) Patent No.: US 8,634,480 B2
(45) Date of Patent: Jan. 21, 2014

(54) SIGNAL TRANSMISSION ARRANGEMENT WITH A TRANSFORMER AND SIGNAL TRANSMISSION METHOD

(75) Inventors: Marcus Nuebling, Esting (DE); Jens Barrenscheen, Munich (DE)

(73) Assignee: Infineon Technologies Austria AG, Villach (AT)

( * ) Notice: Subject to any disclaimer, the term of this patent is extended or adjusted under 35 U.S.C. 154(b) by 404 days.

(21) Appl. No.: 12/895,402

(22) Filed: Sep. 30, 2010

(65) Prior Publication Data

US 2012/0081177 A1    Apr. 5, 2012

(51) Int. Cl.
*H04B 3/00* (2006.01)
*H04L 25/00* (2006.01)

(52) U.S. Cl.
USPC .......................................... 375/258; 375/259

(58) Field of Classification Search
USPC .................. 375/256–260, 295, 377; 343/856
See application file for complete search history.

(56) References Cited

U.S. PATENT DOCUMENTS

| | | | | |
|---|---|---|---|---|
| 3,079,545 A * | 2/1963 | Kretsch et al. | ................. | 323/264 |
| 3,534,264 A | 10/1970 | Blasbalg et al. | | |
| 4,756,007 A | 7/1988 | Qureshi et al. | | |
| 5,426,389 A | 6/1995 | Webster | | |
| 5,465,272 A * | 11/1995 | Smith | ............................ | 375/295 |
| 5,787,120 A * | 7/1998 | Louagie et al. | ................ | 375/257 |
| 6,130,563 A * | 10/2000 | Pilling et al. | .................... | 327/111 |
| 6,828,919 B1 * | 12/2004 | Gold | ......................... | 340/870.29 |
| 6,970,515 B1 * | 11/2005 | Bicakci et al. | ................ | 375/257 |
| 7,042,952 B1 * | 5/2006 | Murphy | ......................... | 375/258 |
| 8,183,887 B2 * | 5/2012 | Stojanovic et al. | .............. | 326/87 |
| 8,305,053 B2 * | 11/2012 | Truong et al. | .................. | 323/224 |
| 2002/0181601 A1 * | 12/2002 | Huang et al. | ................... | 375/258 |
| 2010/0171539 A1 * | 7/2010 | Chang et al. | .................. | 327/170 |
| 2010/0239030 A1 * | 9/2010 | Fukahori et al. | ............... | 375/258 |
| 2010/0246648 A1 * | 9/2010 | Rocamora et al. | ............ | 375/222 |
| 2010/0322323 A1 * | 12/2010 | Hershbarger | ................. | 375/258 |
| 2010/0329364 A1 * | 12/2010 | Giombanco et al. | .......... | 375/258 |
| 2011/0007832 A1 * | 1/2011 | Yamada et al. | ................ | 375/267 |
| 2011/0248750 A1 * | 10/2011 | Seo et al. | ........................ | 327/109 |
| 2012/0043954 A1 * | 2/2012 | Lin et al. | ........................ | 323/284 |

FOREIGN PATENT DOCUMENTS

| | | |
|---|---|---|
| DE | 694 18 359 T2 | 9/1999 |
| DE | 199 40 544 A1 | 3/2001 |
| DE | 101 33 509 C2 | 5/2003 |

* cited by examiner

*Primary Examiner* — Jean B Corrielus
(74) *Attorney, Agent, or Firm* — Slater & Matsil, L.L.P.

(57) ABSTRACT

In accordance with an embodiment, a sender circuit is configured to be coupled to a receiver circuit via a first transmission channel, and generate a drive signal dependent on a data input signal received by the sender circuit and dependent on at least one drive signal generation parameter. The sender circuit is further configured to adjust the at least one drive signal generation parameter dependent on a feedback signal received at a second input.

29 Claims, 7 Drawing Sheets

SIGNAL TRANSMISSION ARRANGEMENT WITH A TRANSFORMER AND SIGNAL TRANSMISSION METHOD

TECHNICAL FIELD

Embodiments of the present invention relate to a signal transmission arrangement with a transformer, in particular, a coreless transformer, and to a signal transmission method.

BACKGROUND

In some technical applications data or signals have to be transmitted between different voltage domains, wherein each voltage domain has its own reference potential, and wherein these reference voltages may vary. An electronic circuit with two different voltage domains is, for example, an electronic circuit with a power transistor connected as a high-side switch, a drive circuit for the power transistor, and a control circuit. In this type of circuit, the control circuit generates a control signal which defines a desired switching state (on or off) of the power transistor and which is received by the drive circuit. The drive circuit generates a drive signal which is dependent on the control signal and which switches the power transistor on or off. The control signal is usually a voltage signal which is referenced to a fixed first reference potential, like ground. The drive signal, however, is usually referenced to a varying second reference potential. This second reference potential may correspond to a voltage across a load connected in series with the power transistor. The voltage swing of this second reference potential and, therefore, a voltage difference between the first and second reference potentials can be up to several hundred volts.

Due to this voltage difference, the control circuit and the drive circuit have to be galvanically decoupled. In other words: a signal transmission arrangement is required between the control circuit and the drive circuit, wherein this transmission arrangement is capable of blocking the high voltages that may occur between the control circuit and the drive circuit, and which enables a signal communication between the control circuit and the drive circuit. Besides optocouplers and level-shifters, transformers, in particular, coreless transformers, can be employed in signal transmission arrangements between two voltage domains.

A signal transmission arrangement with a transformer can be connected between any kind of sender circuit and any kind of receiver circuit. The signal transmission arrangement, besides the transformer, includes a sender circuit and a receiver circuit. The sender circuit is configured to generate a signal suitable to be transmitted via the transformer from user data provided by a signal source, and the receiver circuit is configured to retrieve the user data from the signal transmitted across the transformer. The basics of signal transmission via a signal transmission arrangement with a transformer are commonly known.

Like any electrical signal transmission method, electrical power is required for transmitting information via a signal transmission arrangement with a transformer. The power consumption of such a signal transmission arrangement can be dependent on a plurality of parameters, like the amplitude of signals applied to the transformer, the supply voltages of the sender and receiver circuits, a refresh rate, which is the rate at which transmitted data are again transmitted, a pulsewidth of pulses transmitted via the channel, etc. The power consumption can be reduced by suitably adjusting these parameters. However, a reduced power consumption may lead to an increased error rate.

There is, therefore, a need to provide a signal transmission arrangement which provides for a safe signal transmission at a low power consumption, and to provide a corresponding signal transmission method.

SUMMARY OF THE INVENTION

A first aspect relates to a signal transmission arrangement that includes a sender circuit including a first input for receiving a data input signal, an output for providing a drive signal, and a second input. A first transmission channel with a transformer comprising a primary winding is connected to the output of the sender circuit and a secondary winding. A receiver circuit including an input is connected to the secondary winding, a first output for providing a data output signal, and a second output. A second transmission channel is connected between the second output of the receiver circuit and the second input of the sender circuit. The sender circuit is configured to generate the drive signal dependent on the input signal and dependent on at least one drive signal generation parameter. The receiver circuit is configured to generate a feedback signal and to transmit the feedback signal via the second signal transmission arrangement to the sender circuit, and the sender circuit is configured to adjust the at least one drive signal generation parameter dependent on the feedback signal.

A second aspect relates to a signal transmission method that includes providing a signal transmission arrangement with a first transmission channel connected between a sender circuit and a receiver circuit and comprising a transformer. A second transmission channel is connected between the sender circuit and the receiver circuit. A data input signal is received at the sender circuit and generates a drive signal at the first transmission channel which is dependent on the data input signal and which is dependent on a drive signal generation parameter. A feedback signal is transmitted via the second transmission channel from the receiver circuit to the sender circuit. The at least one drive signal generation parameter is adjusted dependent on the feedback signal.

BRIEF DESCRIPTION OF THE DRAWINGS

Examples will now be explained with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION OF ILLUSTRATIVE EMBODIMENTS

Figure 1:
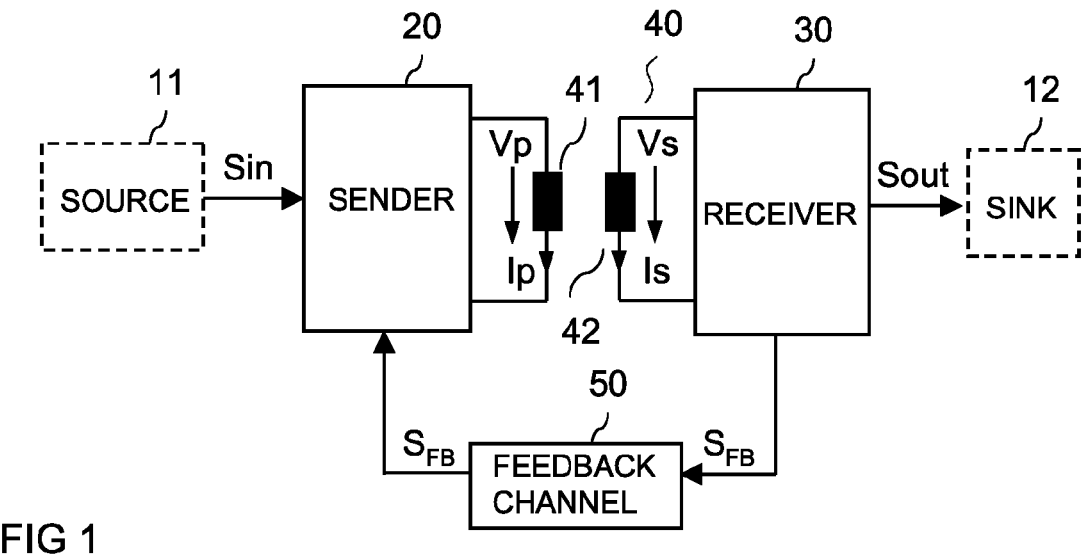
FIG. 1 schematically illustrates a first embodiment of a signal transmission arrangement with a first transmission channel between a sender circuit and a receiver circuit and with a feedback signal transmission channel between the receiver circuit and the sender circuit.

FIG. 1 illustrates an embodiment of a signal transmission arrangement for transmitting a data input signal Sin between two different voltage domains. The signal transmission arrangement includes a sender circuit 20 including a first input for receiving the data input signal Sin, an output for providing a drive signal Vp, Ip and a second input. A first transmission channel 40 is connected to the output of the sender circuit 20. The first transmission channel 40 includes a transformer with a primary winding 41 connected to the output of the sender circuit 20, and a secondary winding 42 which is inductively coupled with the primary winding 41. The transformer is, for example, a coreless transformer, which is a specific type of transformer that does not include a transformer core. However, any other type of transformer, like a transformer having a transformer core, may be used in connection with the signal transmission arrangement as well.

The signal transmission arrangement further includes a receiver circuit 30 including an input connected to the secondary winding 42 of the first transmission channel 40, a first output for providing a data output signal Sout, and a second output. A second transmission channel 50 or second transmission arrangement is connected between the second output of the receiver circuit 30 and the second input of the sender circuit 20. The second transmission arrangement 50 serves to transmit a feedback signal $S_{FB}$ from the receiver circuit 30 to the sender circuit 20. Thus, the second transmission channel arrangement 50 will also be referred to as feedback transmission channel or feedback transmission arrangement in the following. The feedback transmission arrangement 50 can be implemented like any conventional transmission arrangement which is suitable for transmitting signals between two different voltage domains, like the voltage domain of the receiver circuit 30 of FIG. 1 and the voltage domain of the sender circuit 20 of FIG. 1. The feedback transmission arrangement may, for example, include a level shifter, a transformer, or an optocoupler.

Figure 2:
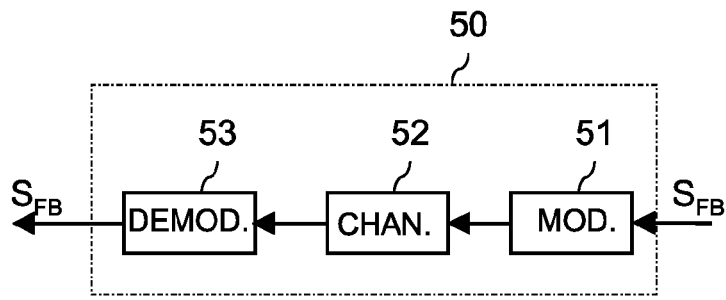
FIG. 2 illustrates a block diagram of one embodiment of the feedback signal transmission channel.

Referring to FIG. 2, the feedback transmission arrangement 50 includes, for example, a modulator 51 which receives the feedback signal $S_{FB}$ from the receiver circuit 30, a second transmission channel 52 connected to the modulator 51, and a demodulator 53 connected to the second transmission channel 52. The transmission channel 52 includes, for example, a level-shifter, a transformer, an optocoupler, or a capacitive coupler. The modulator 51 is configured to transform the received feedback signal $S_{FB}$ into a signal suitable to be transmitted via the transmission channel 52, and a demodulator 53 is configured to transform a signal received at the output of the transmission channel back into the transmitted feedback signal $S_{FB}$. For explanation purposes it will be assumed in the following that the feedback signal the feedback transmission arrangement 50 receives from the receiver circuit 30 corresponds to the feedback signal which the feedback transmission arrangement 50 provides to the sender circuit 20, so that the same reference character $S_{FB}$ is used for both of these signals.

The signal transmission arrangement illustrated in FIG. 1 serves to transmit the data input signal Sin from a data or signal source 11 (illustrated in dashed lines) in the first voltage domain, which is the voltage domain of the sender circuit 20, to a signal or a data sink 12 (illustrated in dashed lines) in the second voltage domain, which is the voltage domain of the receiver circuit 30. The data source 11 can be any type of data source, and the data sink 12 can be any type of data sink. Accordingly, the data input signal Sin to be transmitted via the signal transmission arrangement can be any type of data signal. According to one embodiment, the data source 11 is a control circuit in the first voltage domain, and the data sink 12 is an electronic device in the second voltage domain and is controlled by the control circuit. The control circuit is, for example, implemented as a microcontroller. According to one embodiment, the control circuit is a control circuit for a power transistor, and the electronic device controlled by the control circuit is a power transistor, like a power MOSFET or a power IGBT. In this embodiment, the data input signal Sin is a control signal for switching on and off the power transistor.

Figure 3:
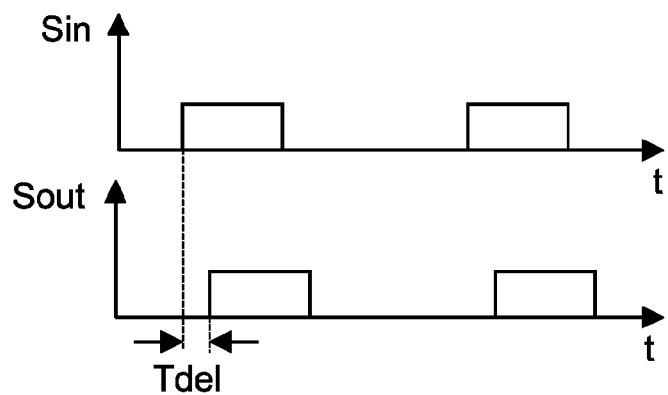
FIG. 3 shows timing diagrams of an input signal and an output signal of the signal transmission arrangement for illustrating a basic operation principle of the signal transmission arrangement.

The signal transmission arrangement is configured to receive the data input signal Sin at the input of the sender circuit 20 and to provide the data output signal Sout at the first output of the receiver circuit 30. Referring to FIG. 3, which illustrates timing diagrams of the input data signal Sin and the data output signal Sout, the data output signal Sout corresponds to the data input signal Sin when no transmission errors occur. The data input signal Sin and the data output signal Sout, however, may have different amplitudes, and a time delay Tdel can exist between these two signals.

The basic operating principle of the signal transmission arrangement is as follows: the sender circuit 20 generates a drive signal Sp dependent on the data input signal Sin at its output, i.e., at the primary winding 41 of the transformer. This drive signal Sp can be a primary voltage Vp across the primary winding 41 or a primary current Ip through the primary winding 41. It should be noted that a primary voltage Vp other than zero always causes a primary current Ip through the primary winding 41, and vice versa. However, the sender circuit 20 can be configured to either control the primary voltage Vp or to control the primary current Ip for signal transmission purposes. By virtue of the magnetic coupling between the primary winding 41 and the secondary winding 42, a primary voltage Vp and a primary current Ip other than zero cause a secondary voltage Vs across the secondary winding 42 and a secondary current Is through the secondary winding 42 which are other than zero. The receiver circuit 30 is configured to evaluate the secondary voltage Vs and/or the secondary current Is and to generate the data output signal Sout from these signals Vs, Is received at its input.

The sender circuit 20 and the receiver circuit 30 are each connected to power supplies (not illustrated). These power supplies provide the electrical power or energy which is required in the sender circuit 20 to generate the drive signal Vp, Ip from the data input signal Sin, and is required in the receiver circuit 30 to generate the data output signal Sout from the signals Vs, Is available at the secondary winding 42 of the transformer. The power consumption of the signal transmission arrangement is dependent on a plurality of different factors. Generally, it is desirable to keep the power consumption of the signal transmission arrangement as low as possible. The power consumption can, for example, be reduced by reducing the amplitude of the channel drive signals Vp, Ip. However, reducing the transmitted power, i.e., the power of the signals transmitted via the first channel, may result in an increased error rate. Further, the conditions for the signal transmission via the transmission channel may vary, wherein these conditions can be influenced by a plurality of factors, like the temperature in the sender circuit 20 or the receiver circuit 30, the available supply voltages in the sender circuit 20 and the receiver circuit 30, or noise signals, like electromagnetical interferences (EMI), coupled into the channel from an external source (not shown). In a best-case scenario a comparatively low power of the drive signals Vp, Ip can be sufficient in order to achieve an error-free signal transmission, while in a worst-case scenario a comparatively high power can be required. Since the transmission conditions can vary, in conventional systems the signal power of the drive signals is selected such that a proper signal transmission is obtained under worse-case conditions. However, most of the time such high power/energy of the drive signal is not necessary, resulting in a waste of electrical energy.

In order to optimize the power consumption of the signal transmission arrangement of FIG. 1, the sender circuit 20 generates the drive signal Vp, Ip dependent on the feedback signal $S_{FB}$ received from the receiver circuit 30, The feedback signal $S_{FB}$ provides feedback information which helps the sender circuit 20 to adjust signal generation parameters used for generating the drive signals Vp, Ip such that the power consumption in the sender circuit 20 can be minimized (at a given error rate).

According to one embodiment, the feedback signal $S_{FB}$ represents one of the following parameters or includes information on one of the following parameters: a temperature at the receiver circuit 30, a supply voltage at the receiver circuit 30, or an error rate detected at the receiver circuit 30. According to one embodiment, the sender circuit 20 is configured to increase the electric power of the signals or signal pulses transmitted from the sender circuit 20 to the receiver circuit 30 when the feedback signal $S_{FB}$ indicates an increasing temperature in the receiver circuit and/or when the feedback signal $S_{FB}$ indicates a decreasing supply voltage of the receiver circuit 30.

The error rate, besides internal parameters, like the temperature and the voltage in the receiver circuit 30, can also be dependent on external influences, like noise coupled into the transmission channel.

The error rate can, for example, be determined by regularly transmitting test patterns, which are selected such that even when transmission errors occur, the test patterns are recognized to be test patterns by the receiver circuit 30 and can be evaluated accordingly. According to a further embodiment, data are transmitted from the sender circuit 20 to the receiver circuit 30 in data frames, wherein each data frame includes user data, and redundancy data. The redundancy data can be used to detect transmission errors. The redundancy data can include any known type of redundancy data that can be used to detect transmission errors, like CRC data (CRC=cyclic redundancy check) or a signature. According to another embodiment, the redundancy data again include the user data, i.e., the user data are transmitted several times within one frame. The number of repetitions, i.e., the number of times the user data are transmitted within one frame, are known to the receiver. A transmission error can be detected when the user data are received less than the given number of times within one frame.

Figure 4:
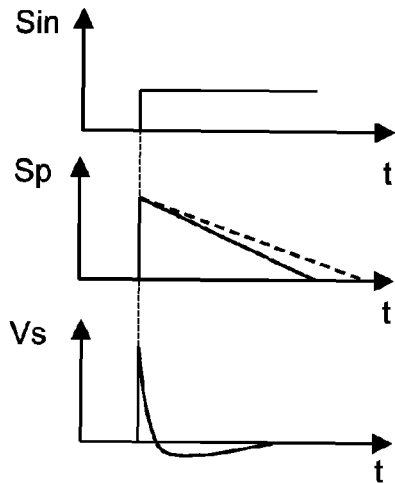
FIG. 4 shows timing diagrams illustrating the operating principle of the sender circuit according to a first embodiment.

There are different parameters of the drive signals Vp, Ip which can be adjusted dependent on the feedback signal $S_{FB}$. A first embodiment will now be explained with reference to FIG. 4. FIG. 4 schematically illustrates timing diagrams of the data input signal Sin, the drive signal Sp at the primary winding 41, and the secondary voltage Vs. According to this embodiment, the sender circuit 20 is configured to detect a first edge of the data input signal Sin and to generate a first signal pulse with a rising first edge and a falling second edge upon detection of the first edge of the input data signal Sin, wherein one of the first and second edges of the signal pulse has a higher slew rate than the other one of the first and second edges. In the embodiment illustrated in FIG. 4, the first edge of the data input signal Sin is a rising edge of the data input signal Sin. When the data input signal Sin is used for controlling an electronic device, the rising edge of the data input signal Sin indicates, for example, that the electronic device is to be switched on.

In FIG. 4, Sp denotes one of the drive signals of the primary winding 41, i.e., either the primary voltage Vp or the primary current Ip. In the embodiment illustrated in FIG. 4, the rising first edge has a significantly higher slew rate than the falling second edge of the signal pulse of the drive signal. It is commonly known that a signal pulse (a voltage pulse or a current pulse) at a primary winding of a transformer causes a signal pulse at the secondary winding of the transformer, wherein the amplitude of the secondary signal pulse is dependent on the slew rate of the edges of the primary signal pulse. Referring to FIGS. 1 and 4, the slew rate of the edges of the signal pulse at the primary winding 41 is either dVp/dt or dIp/dt. The basic idea of generating a drive signal Sp with a fast increasing first edge and a slowly decreasing second edge is to generate only one signal pulse at the secondary side, instead of generating two signal pulses at the secondary side, namely a first positive signal pulse and a second negative signal pulse, which would be the case when a drive signal with a rapidly increasing first edge and a rapidly decreasing second edge would be used.

Figure 5:
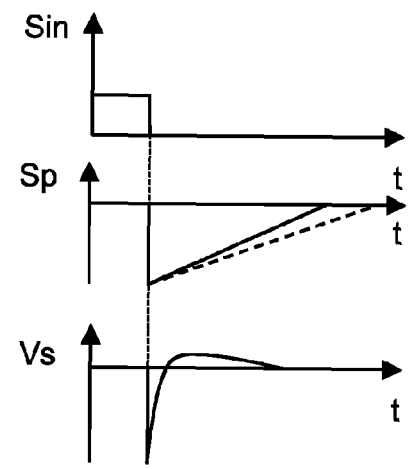
FIG. 5 shows timing diagrams illustrating the operating principle of the sender circuit according to a second embodiment.

Referring to FIG. 5, the sender circuit 20 is further configured, to detect second edges of the data input signal Sin and to generate a second signal pulse upon detection of such second edge. In the embodiment illustrated in FIGS. 4 and 5, the second edge of the data input signal Sin is a falling edge. The second signal pulse includes a falling first edge and a rising second edge, wherein the slew rate of the falling edge is higher than the slew rate of the rising edge. The secondary voltage Vs has a negative signal pulse at the time of falling edge of the drive signal Sp.

The receiver circuit 30 is configured to detect positive and negative signal pulses of the secondary voltage Vs and to generate the data output signal Sout such that the data output signal Sout has a rising edge when a positive signal pulse (see FIG. 4) of the secondary voltage Vs is detected, and to generate a falling edge of the data output signal Sout, when a negative signal pulse (see FIG. 5) of the secondary voltage Vs is detected. The slew rates of slowly decreasing edges of the drive signal Sp, which is the falling edge in FIG. 4 and the rising edge in FIG. 5, should be selected such that they do not cause voltage pulses or voltage spikes of the secondary voltage Vs which could erroneously be interpreted by the receiver circuit 30 as a signal pulse indicating a rising or a falling edge of the data input signal Sin.

Referring to the discussion hereinbefore, the risk that the second edges of the first and second signal pulses result in signal pulses of the secondary winding Vs from which the receiver circuit 30 erroneously generates falling or rising edges of the data output signal Sout increases with increasing slew rate of these second edges. However, the power consumption of the sender circuit 20 increases, when the slew rates of these second edges are decreased, so that the signal pulse becomes longer. According to one embodiment, the second slew rates of the first and second signal pulses are adjusted dependent on the feedback signal $S_{FB}$ in order to optimize the power consumption. When the temperature in the receiver circuit 30 increases, the receiver circuit 30 becomes less sensitive to changes of the received signal pulses. Thus, at higher temperatures higher slew rates of the second edges can be tolerated, without causing the detection of a signal pulse, than at lower temperatures. According to one embodiment, the sender circuit 20 is, therefore, configured to decrease the slew rate of the second edges when the feedback signal $S_{FB}$ indicates a decreasing temperature. Further, the receiver circuit becomes more sensitive, when its supply voltage increases. According to one embodiment, the receiver circuit 30 is, therefore, configured to reduce the slew rate of the second edges when the feedback signal $S_{FB}$ indicates an increasing supply voltage of the receiver circuit 30.

Figure 6:
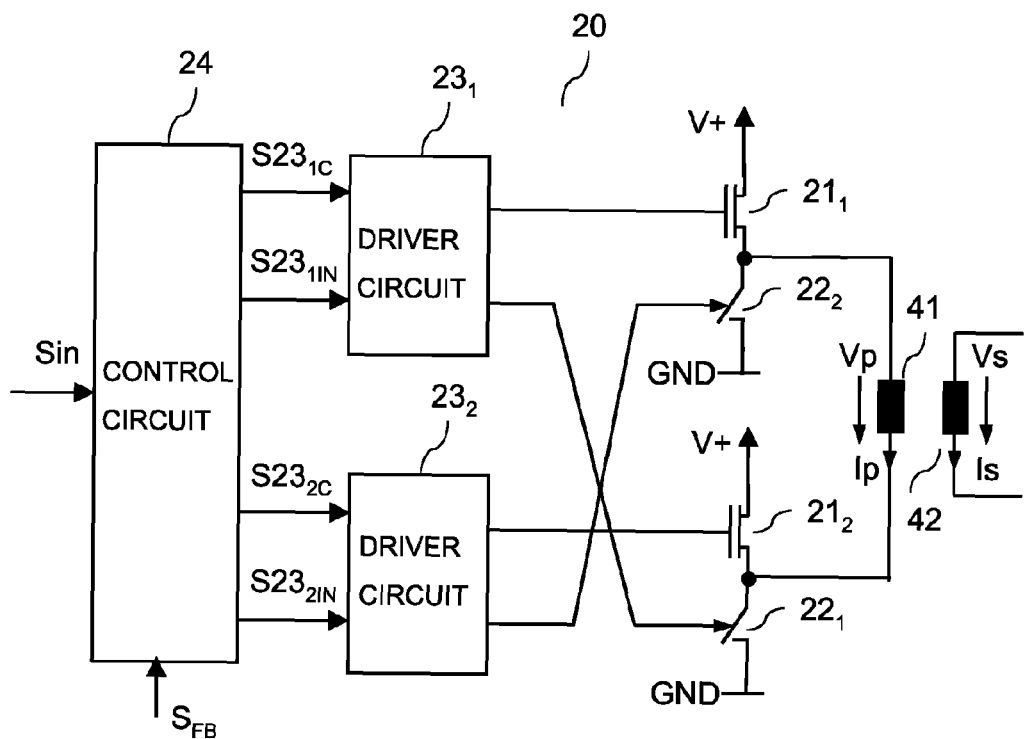
FIG. 6 illustrates a first embodiment of the sender circuit.

FIG. 6 illustrates a first embodiment of a sender circuit 20 which is configured to generate the drive signal Vp, Ip in accordance with the embodiments illustrated in FIG. 4. This sender circuit 20 includes a control circuit 24 which receives the data input signal Sin and the feedback signal $S_{FB}$. The sender circuit 20 further includes a drive signal generation circuit which is controlled by the control circuit 24 and generates the primary voltage Vp and the primary current Ip of the transformer in channel 40. The drive signal generation circuit includes two driver stages from which one driver stage serves to generate a positive drive signal Sp, i.e., a positive primary voltage Vp and a positive primary current Ip, and the other serves to generate a negative drive signal Sp, i.e., a negative primary voltage Vp and a negative primary current Ip. In the embodiment illustrated in FIG. 6, the first driver stage includes a first transistor $21_1$ connected between a first terminal of the primary winding 41 and a terminal for a first supply potential V+, and a first switch $22_1$ connected between a second terminal of the primary winding 41 and a terminal for a second supply potential GND. The first driver stage further includes a first driver circuit $23_1$ connected to control terminals of the first transistor $21_1$ and the first switch $22_1$. The first drive circuit $23_1$ receives an input signal $S23_{1IN}$ and a control signal $S23_{1C}$ from the control circuit 24 and is configured to drive the transistor $21_1$ and the switch $22_1$ dependent on these signals $S23_{1IN}$, $S23_{1C}$. The first driver circuit $23_1$ is activated by the control circuit 24 via the input signal $S23_{1IN}$, when the data input signal Sin has a rising edge. In this case, the first drive circuit $23_1$ drives the transistor $21_1$ such that either the voltage Vp across the primary winding 41, or the current Ip through the primary winding 41 has a signal pulse according to FIG. 4 with a rapidly increasing first edge and a slowly increasing second edge.

The control signal $S23_{1C}$ is generated by the control circuit 24 dependent on the feedback signal $S_{FB}$, wherein the first drive circuit $23_1$ is configured to generate this signal pulse of the primary voltage Vp or the primary current Ip dependent on this control signal $S23_{1C}$ such that the second edge, in particular, the slew rate of the second edge, of the signal pulse is dependent on this control signal $S23_{1C}$.

The control circuit 24 is, for example, implemented as a microcontroller. In this connection it should be mentioned that the data source 11 (illustrated in dashed lines in FIG. 1) and the control circuit 24 of the sender circuit 20 could be implemented by the same microcontroller.

Referring to FIG. 6, the sender circuit 20 further includes a second driver stage. This second driver stage is implemented like the first driver stage and includes a second transistor $21_2$ connected between the second terminal of the primary winding 41 and the first supply potential V+ terminal, a second switch $22_2$ connected between the first terminal of the primary winding 41 and the second supply potential GND terminal, and a second driver circuit $23_2$ which drives the second transistor $21_2$ and the second switch $22_2$ dependent on an input signal $S23_{2IN}$ and a control signal $S23_{2C}$ received from the control circuit 24. The second driver stage is activated by the control circuit 24 when the data input signal Sin has a falling edge. When the second driver stage is activated, the second switch $22_2$ is switched on, and the second transistor $21_2$ is controlled such that the primary voltage Vp or the primary current Ip has a rapidly decreasing first edge and a slowly increasing second edge.

The operating principle of the first and second driver stages is similar, with the difference that the first driver stage causes the primary current Ip to flow in a first (positive) direction, while the second driver stage causes the primary current Ip to flow in a second (negative) direction.

Figure 7:
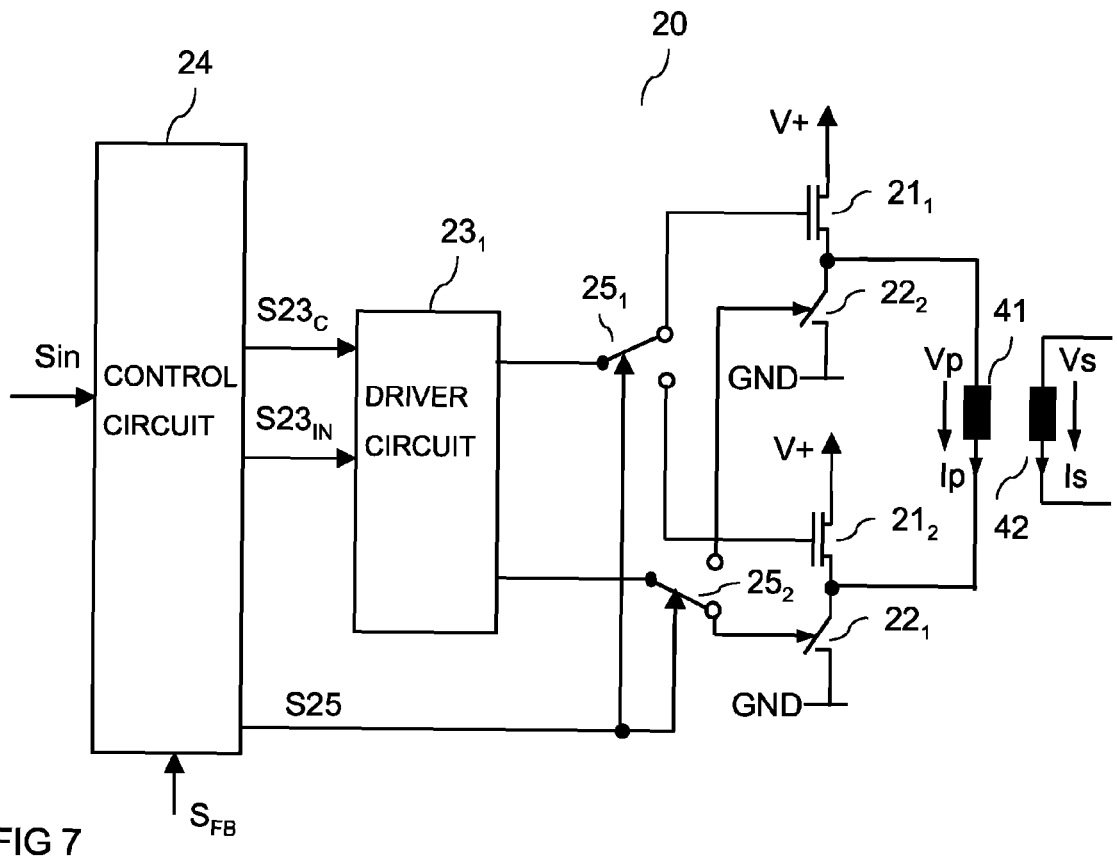
FIG. 7 illustrates a second embodiment of the sender circuit.

Referring to FIG. 7, the driver circuit can be implemented with one driver stage 23 and two change over switches $25_1$, $25_2$. In this embodiment, the driver circuit $23_1$ receives an input signal $S23_{IN}$ and a control signal $S23_C$ from the control circuit 24 and further provides a control signal S25 for the two switches $25_1$, $25_2$. The first switch $25_1$ serves to switch the first output of the driver circuit $23_1$ between the first and second transistors $21_1$, $21_2$, and a second switch $25_2$ serves to switch the second output of the driver circuit $23_1$ between the first switch $22_1$ and the second switch $22_2$. The two switches $25_1$, $25_2$ are actuated simultaneously, so that either the first transistor $21_1$ and the first switch $22_1$ or the second transistor $21_2$ and the second switch $22_2$ are coupled to the driver circuit $23_1$. The driver circuit $23_1$ is activated by the control circuit 24 each time the data input signal Sin has a rising edge or a falling edge, wherein the control circuit 24 switches the switches $25_1$, $25_2$ in the first position when the data input signal Sin has a rising edge, and into the second position, when the data input signal Sin has a falling edge. In this circuit, the first and second signal pulses of the drive signal have first edges with identical slew rates and second edges with identical slew rates, wherein the slew rate of the second edges is adjusted by the control signal $S23_C$ dependent on the feedback signal $S_{FB}$.

Figure 8:
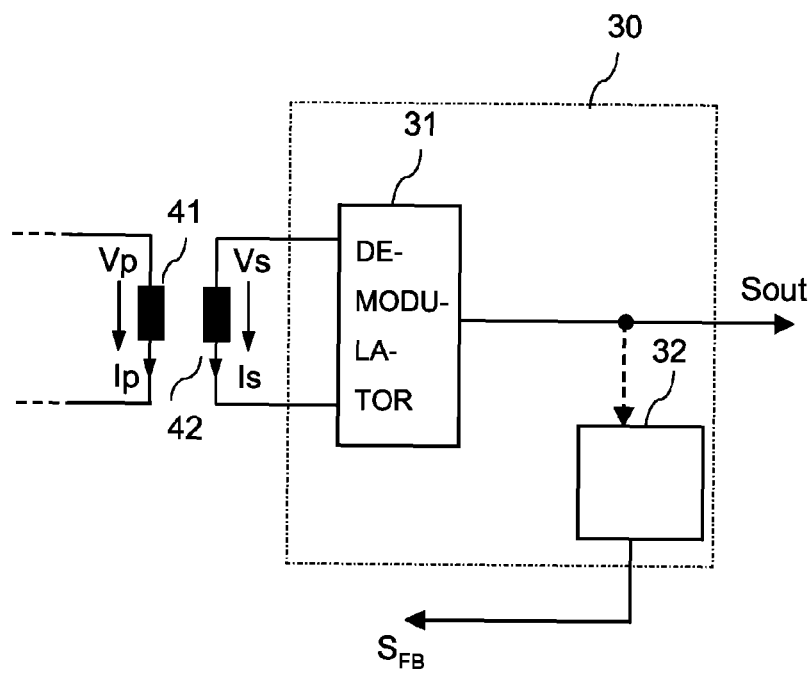
FIG. 8 illustrates an embodiment of a receiver circuit including a demodulator circuit and a control circuit.

FIG. 8 illustrates an embodiment of the receiver circuit 30. This receiver circuit 30 includes a demodulator circuit 31 connected to the secondary winding 42 which generates the data output signal Sout dependent on the secondary voltage Vs or the secondary current Is. The receiver circuit 30 further includes a control circuit 32 which generates the feedback signal $S_{FB}$ and which optionally receives the data output signal Sout.

Figure 9:
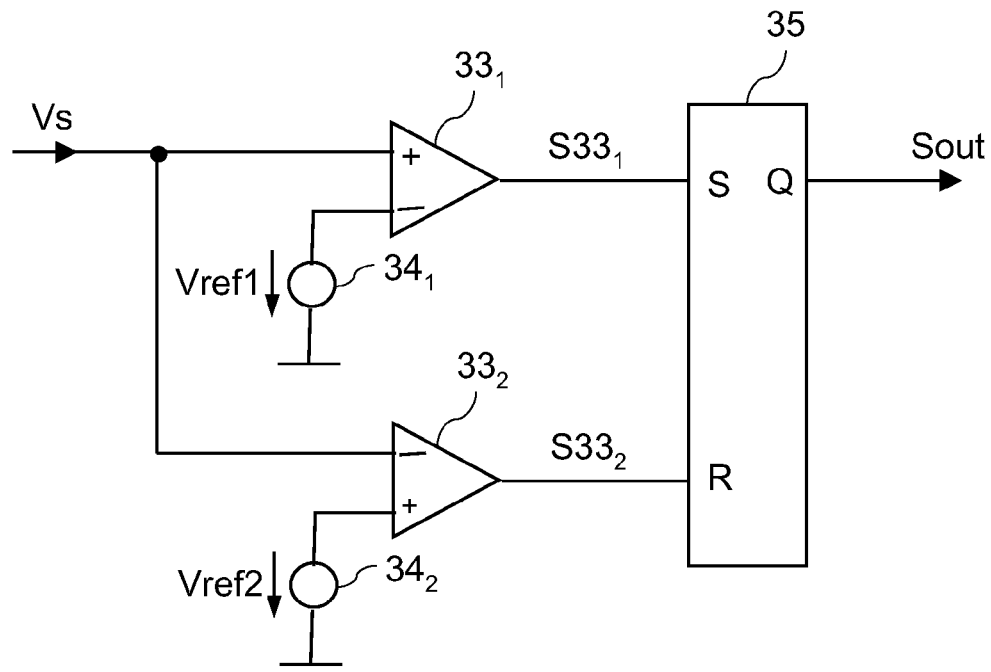
FIG. 9 illustrates an embodiment of the demodulator circuit of the receiver circuit.

An embodiment of the demodulator circuit 31 is illustrated in FIG. 9. This demodulator circuit 31 includes first and second comparators $33_1$, $33_2$ which compare the secondary voltage Vs with first and second reference voltages Vref1, Vref2 generated by first and second reference voltage generators $34_1$, $34_2$. An output of the first comparator $33_1$ is connected to a first input of a flip-flop 35, and an output of the second comparator $33_2$ is connected to a second input of the flip-flop 35. In the embodiment illustrated in FIG. 9, the first input of the flip-flop 35 is a set input, while the second input is a reset input. The data output signal Sout is available at the output Q of the flip-flop 35. In the embodiment illustrated in FIG. 9, flip-flop 35 is set by the first comparator $33_1$, when the secondary voltage Vs has a positive signal pulse which is higher than the first reference voltage Vref1 provided by the first voltage source, and flip-flop 35 is reset, when the secondary voltage Vs has a negative signal pulse which is below the second reference voltage Vref2 provided by the second voltage source $34_2$. Thus, the data output signal Sout has a rising edge when a positive signal pulse of the secondary winding Vs is detected, and has a falling edge, when a negative signal pulse of the secondary voltage Vs is detected. However, this is only an example, the demodulator circuit 31 can easily be modified such that negative signal pulses of the secondary winding Vs result in rising edges of the data output signal Sout, and positive signal pulses result in falling edges of the data output signal Sout.

According to one embodiment, the sender circuit 20 and the receiver circuit 30 can assume or enter a calibration mode. In this calibration mode the sender circuit 20 independent of the data input signal Sin generates a sequence of drive pulses, for example, a sequence of positive pulses (see FIG. 4) or a sequence of negative pulses (see FIG. 5), wherein the sender circuit 20 varies the parameters for generating these signal pulses over time. The parameter which is varied is, for example, the slew rate of the second edges. According to one embodiment, the sender circuit 20 starts with signal pulses having a high slew rate of the second edges and decreases the slew rate over time. The receiver circuit 30 in the calibration mode either transmits every detection result over the feedback transmission channel back to the sender circuit 20, or transmits only those information back to the sender circuit 20 which is necessary for the sender circuit 20 to evaluate, if the receiver circuit 30 erroneously detects the second edges of the signal pulses as first edges. According to one embodiment, the receiver circuit 30 transmits signal pulses via the feedback channel 50 back to the sender circuit 20 each time second edges of the drive pulses are detected. In this case, the flip-flop 35 in the demodulator circuit 31 (see FIG. 9) is reset a short time after it has been set. Dependent on the information provided by the receiver circuit 30 via the feedback transmission channel 50, the sender circuit 20 can adjust the signal generation parameters. This type of calibration cycle is, for example, performed at the start-up of the system, i.e., when a power supply of the signal transmission arrangement is switched on. Of course, it is also possible to cyclically perform such calibration cycles.

According to another embodiment, a signal pulse which allows the receiver circuit 30 to detect the transmission or detection quality is transmitted with each drive pulse. Such a signal pulse will be referred to as an adjustment pulse in the following. According to one embodiment, the parameters of the adjustment pulses, like amplitude, pulsewidth, or slope, are varied with time. The receiver circuit 30 is configured to detect the adjustment pulses and is configured to provide a feedback to the sender circuit 20, wherein the feedback is dependent on whether the receiver circuit 30 has received the adjustment signal correctly or not.

According to a further embodiment, not only the slew rate of the second edges, but also the amplitude of the drive signal Sp is adjusted dependent on the feedback signal $S_{FB}$. According to one embodiment, the supply voltage, which is the voltage between the first and second supply potential V+, GND, is increased, when the feedback signal $S_{FB}$ indicates that a supply voltage of the receiver circuit 30 has decreased.

Figure 10:
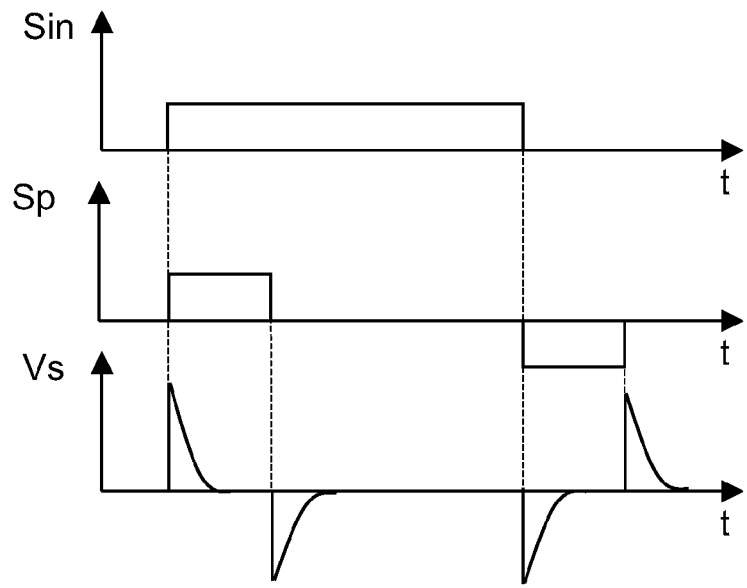
FIG. 10 shows timing diagrams illustrating the operating principle of the sender circuit according to a further embodiment.

FIG. 10 illustrates a further embodiment of a signal transmission method, which can be performed with a signal transmission arrangement according to FIG. 1. In this method, a first signal pulse of the drive signal Sp is generated, when the data input signal Sin has a first edge, and a second signal pulse of the drive signal Sp is generated, when the data input signal Sin has a second edge. In the embodiment illustrated in FIG. 11, the first edge of the data input signal Sin is a rising edge and the first signal pulse of the drive signal Sp is a positive signal pulse, while the second edge of the data input signal Sin is a falling edge and the second signal pulse is a negative signal pulse. Drive signal Sp in FIG. 11, like in the embodiment illustrated in FIGS. 4 and 5, denotes one of the primary voltage Vp or the primary current Ip of the primary winding 41. The first and second signal pulses have rapidly increasing and rapidly decreasing edges, so that each of the edges of the first and second signal pulses causes a voltage pulse of the secondary voltage Vs, which is also illustrated in FIG. 10.

Referring to the explanation hereinbelow, only the secondary voltage Vs pulses caused by the first edges or leading edges of the drive signal Sp pulses are used, while the secondary voltage Vs pulses caused by the second or trailing edges of the drive signal Sp pulses are blanked-out. The secondary voltage Vs pulses caused by the leading edges of the drive signal Sp pulses will be referred to as first signal pulses in the following. The amplitude and the duration and, therefore, the energy of these first signal pulses is dependent on the amplitude and the duration of the pulses of the drive signal Sp. The amplitude of the first signal pulses increases when the amplitude of the drive signal increases, and the duration of the first signal pulses increases, when the duration of the drive signal Sp pulses increases. Generally, first signal pulses with a large amplitude can be more easily detected by the receiver circuit 30 than first signal pulses with a lower amplitude. Further, first signal pulses with a larger duration can be more easily detected by the receiver circuit 30 than first signal pulses with a smaller duration. According to one embodiment, at least one of the amplitude and the duration of the pulses of the drive signal Sp is adjusted dependent on the feedback signal $S_{FB}$. According to one embodiment, the amplitude and/or duration of the drive signal Sp signal pulses is increased, when the feedback signal $S_{FB}$ signals a low supply voltage of the receiver circuit 30 or a high error rate.

Figure 11:
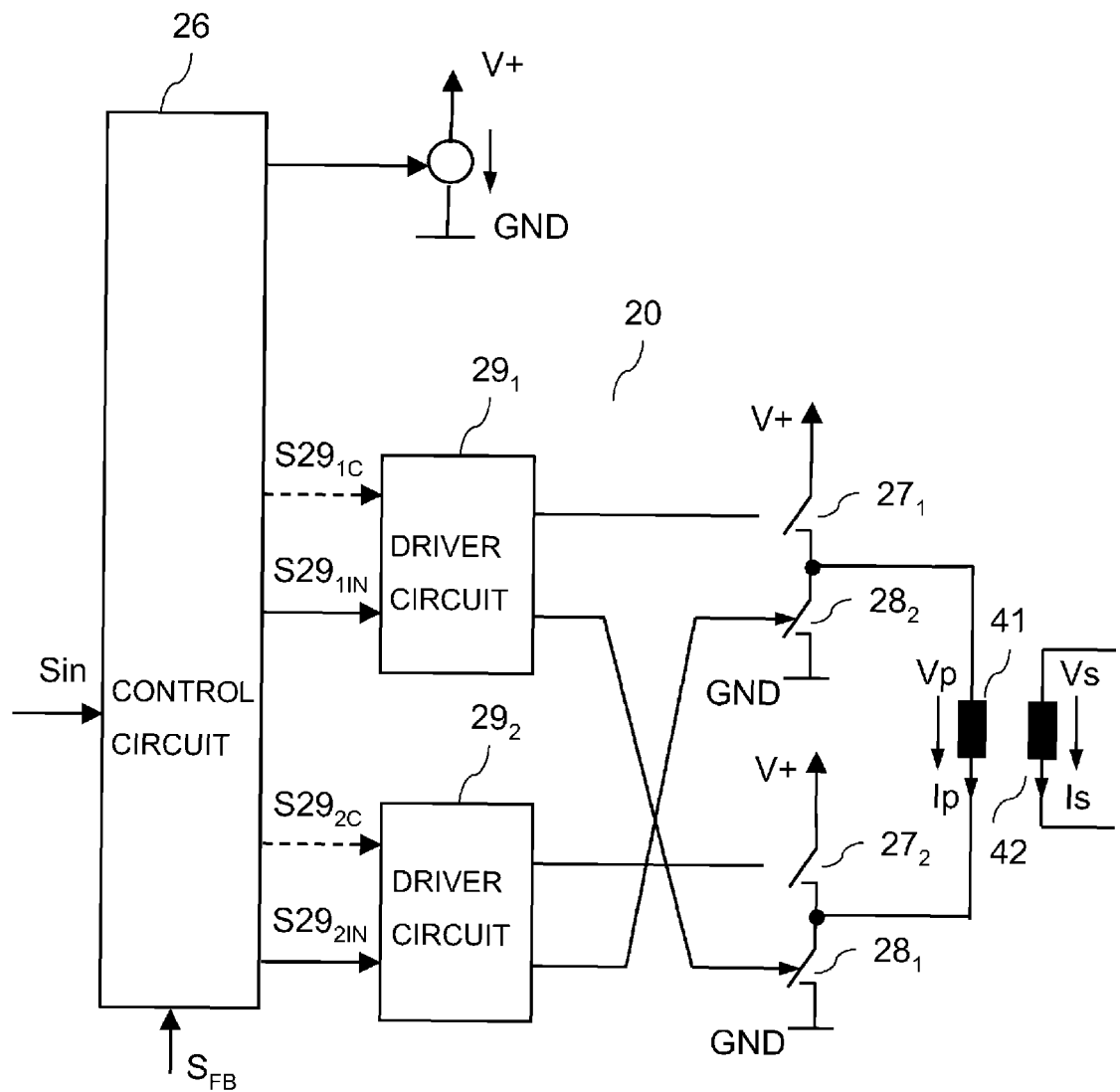
FIG. 11 illustrates an embodiment of the sender circuit according to a third embodiment.

An embodiment of a sender circuit 20 for generating the drive signal pulses Sp illustrated in FIG. 10 will now be explained with reference to FIG. 11. This sender circuit 20 includes a control circuit 26 which receives the data input signal Sin and the feedback signal $S_{FB}$ and which controls first and second driver stages. The first driver stage includes a first switch $27_1$ connected between the first terminal of the primary winding 41 and the first supply voltage V+ terminal, and a second switching element $28_1$ connected between the second terminal of the primary winding 41 and the second supply voltage GND terminal. The first and second switches $27_1$, $28_1$ are controlled by a first driver stage $29_1$ which receives an input signal $S25_{1IN}$ from the control circuit 26. The control circuit 26 is configured to activate the first drive circuit $29_1$ each time a rising edge of the data input signal Sin occurs. When the first driver circuit $29_1$ is activated, it switches the first and second switches $27_1$, $28_1$ on for a given time duration, which defines the duration of the first signal pulse of the drive signal Sp in the present embodiment. In this embodiment, the drive signal Sp is the voltage Vp across the primary winding 41. The amplitude of the drive signal pulse is defined by the supply voltage between the first and second V+, GND terminals. Referring to FIG. 11, the supply voltage can be provided by a supply voltage source. According to one embodiment, the control circuit 26 adjusts the supply voltage dependent on the feedback signal $S_{FB}$. Alternatively or additionally, the control circuit 26 adjusts a duration of the drive signal pulses via a control signal $S29_{1C}$ provided to the first drive circuit $29_1$.

It should be noted that the control circuits 24 and 26 illustrated in FIGS. 6, 7 and 11 can be implemented as micro controllers. According to one embodiment, the signal source 11 (see FIG. 1) and the control circuits 24, 26 are commonly implemented by one micro controller.

For generating the second drive signal pulses, the sender circuit 20 of FIG. 11 includes a second driver stage which is implemented like the first driver stage, wherein a first switch $27_2$ of the second driver stage is connected between the second terminal of the primary winding 41 and the first supply voltage V+ terminal, and a second switch $28_2$ is connected to the first terminal of the primary winding 41 and the second supply voltage GND terminal. These two switches $27_2$, $28_2$ are driven by a second driver circuit $29_2$ which is activated by the control circuit 26 each time the data input signal Sin has a falling edge. The duration of the second drive signals can be adjusted via a control signal $29_{2C}$ provided by the control circuit 26 to the second driver stage $29_2$.

Figure 12:
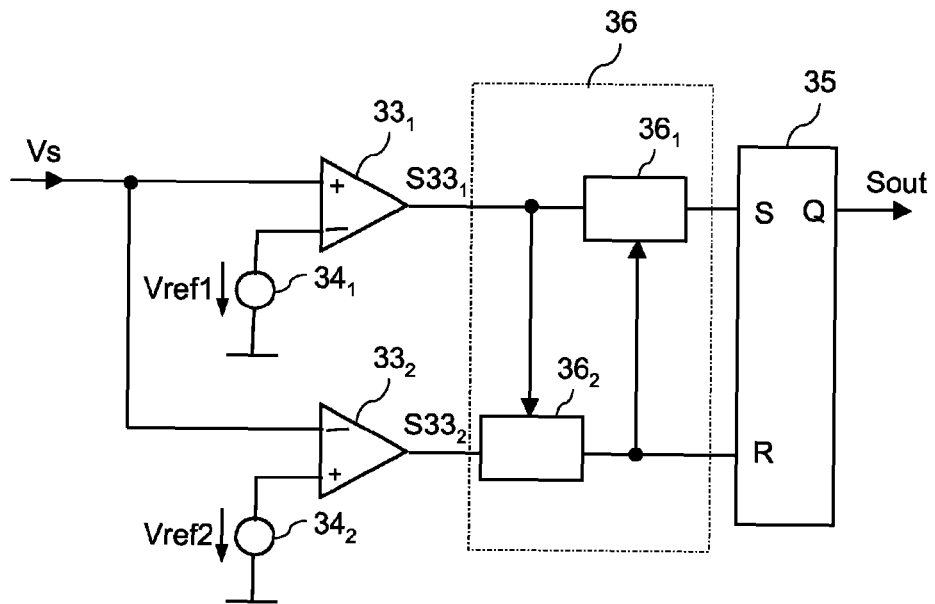
FIG. 12 schematically illustrates a receiver circuit according to a further embodiment.

An embodiment of a receiver circuit 30 which is suitable for receiving and processing the signal pulses illustrated in FIG. 10 is illustrated in FIG. 12. This receiver circuit includes a demodulator which is based on the demodulator illustrated in FIG. 9 and which is different from the demodulator illustrated in FIG. 9 in that it additionally includes a blanking circuit 36 connected between the comparators $33_1$, $33_2$ and the flip-flop 35. The blanking circuit 36 includes a first blanking unit $36_1$ connected between the first comparator $33_1$ and the flip-flop 35, and a second blanking unit $36_2$ connected between the second comparator $33_2$ and the flip-flop 35. The first blanking unit $36_1$ is controlled by an output signal of the second comparator $33_2$, and the first blanking unit $36_1$ is controlled by an output signal of the first comparator $33_1$. The first blanking unit $36_1$ is configured to ignore or blank-out a signal pulse occurring at the output of the first comparator $33_1$ within a defined time period after a signal pulse at the output of the second comparator $33_2$ has occurred, and the second blanking unit $36_2$ is configured to ignore or blank-out signal pulses occurring at the output of the second comparator $33_2$ within a defined time period after a signal pulse at the output of the first comparator $33_1$ has occurred. By virtue of the blanking unit 36 only signal pulses at the outputs of the first and second comparators $33_1$, $33_2$ resulting from leading edges of the drive signal Sp pulses affect the logic state of the flip-flop 35 and, therefore, affect the output signal Sout. The blanking time defined in the first and second blanking units $36_1$, $36_2$ is, for example, adjusted such that signal pulses at the comparator outputs resulting from trailing edges of the drive signal Sp pulses are reliably blanked out. This blanking time equals, for examples, a maximum duration of the drive signal pulses, or is slightly longer than this maximum duration.

Figure 13:
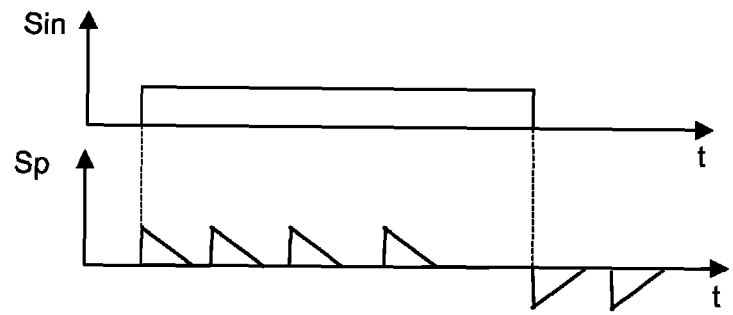
FIG. 13 illustrates the operating principle of the sender circuit according to a further embodiment.

According to a further embodiment of a signal transmission method drive signal pulses are not only generated when a rising or a falling edge of the data input signal Sin occurs, but these drive signal pulses are cyclically repeated. This is schematically illustrated in FIG. 13. Referring to FIG. 13, a drive signal pulse is generated, when a first edge of the data input signal Sin occurs, and this drive signal pulse is then cyclically repeated, wherein the repetition cycles may have equal or different durations. In the embodiment illustrated in FIG. 13, the first edge of the input signal Sin is a rising edge, and the first signal pulse is a positive signal pulse. These signal pulses correspond to the signal pulses illustrated in FIGS. 4 and 5. However, the signal pulses according to the method illustrated in FIG. 10 may be used as well. The rate at which the signal pulses are repeated is commonly known as refresh rate. According to one embodiment this refresh rate is adjusted dependent on the feedback signal $S_{FB}$. In the sender circuit 20 illustrated in FIGS. 6, 7 and 11, the control circuits 24 and 26, respectively, can be modified to activate the driver stages not only when a rising or a falling edge of the data input signal Sin occurs, but to activate the driver stages cyclically after such rising or falling edge have occurred. The refresh rate can be adjusted dependent on the temperature in the receiver circuit 30, the supply voltage of the receiver circuit 30 or an error rate detected in the receiver circuit 30.

Referring to what has been explained hereinbefore, the receiver circuit 30 becomes less sensitive when the temperature in the receiver circuit 30 increases or when the supply voltage of the receiver circuit 30 decreases. According to one embodiment, the sender circuit 20 is, therefore, configured to increase the refresh rate when the feedback signal $S_{FB}$ indicates an increasing temperature in the receiver circuit 30 and/or when the feedback signal $S_{FB}$ indicates a decreasing supply voltage in the receiver circuit, in order to prevent an increase in the error rate.

Figure 14:
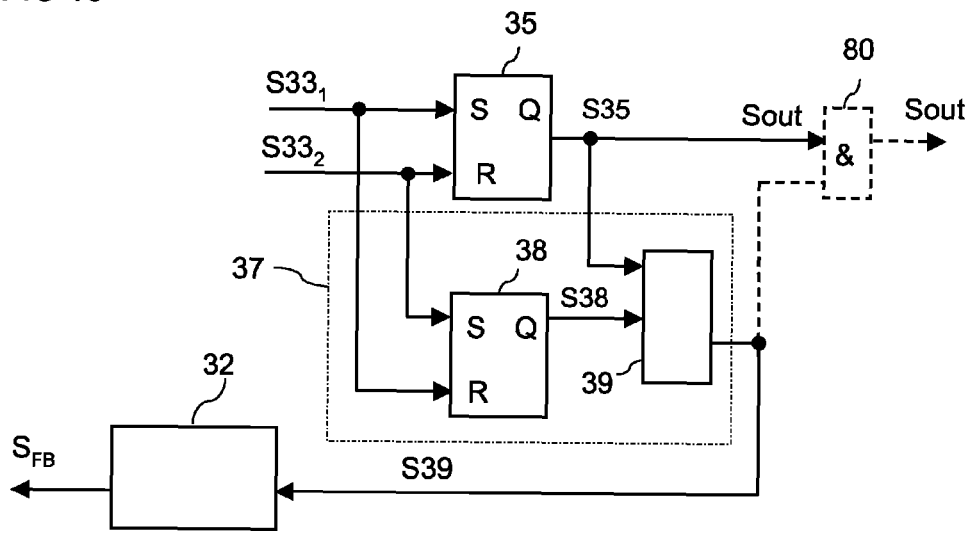
FIG. 14 schematically illustrates an embodiment of an error detection circuit of the receiver circuit.

An embodiment of a receiver circuit 30 which is capable of detecting possible errors occurring in the receiver circuit 30 is illustrated in FIG. 14. This receiver circuit 30 includes an error detection circuit 37. It should be noted that in FIG. 14 besides the error detection circuit 37 only a part of the receiver circuit 30, namely the flip-flop 35 of the demodulator and the control circuit 32, is illustrated. The error detection circuit 37 includes a second flip-flop 38 with a reset input R and a set input S. The reset input R of this flip-flop 38 is connected to the set input S of the first flip-flop 35, and the set input S of the second flip-flop 38 is connected to the reset input R of the first flip-flop 35. During normal operation of the receiver circuit 30 the output signals Sout, S35. of the first flip-flop 35 and S38 of the second flip-flop 38 are complementary. A logic gate 39 receives the output signals of the first and second flip-flops 35, 38 and generates an error signal S39 which is received by the control circuit 32. The logic gate 39 is, for example, an XOR-gate which has a first signal level, like a high-level, when the output signals of the first and second flip-flops 35, 38 are complementary, and which has a second signal level, like a low-level, when the output signals of the first and second flip-flops 35, 38 are equal. Equal signal levels of the output signals Sout, S38 of the flip-flops may, for example, occur when a supply voltage of the receiver circuit 30 is interrupted. The flip-flops 35, 38 are configured such that they enter a defined logic state at power-up, i.e., when the power supply of a receiver circuit 30 is again available. These defined states are such that the output signals Sout, S38 of the flip-flops are equal, which is detected as an error state by the XOR-gate 39. In this case, the control circuit 32 via the feedback signal $S_{FB}$ can request the sender circuit 20 to repeat the drive signal pulse which has been transmitted as a last drive signal pulse or to send a refresh pulse.

According to a further embodiment, which is illustrated in dashed lines in FIG. 14, the output signal Sout is not only dependent the output signal of the flip-flop 35 but is also dependent on the error signal S39. In this embodiment, the output signal Sout, independent of the signal level of the output signal of the flip-flop 35, is set to an switch-off level when the error signal S39 indicates an error. In the specific embodiment illustrated in FIG. 14, the output signal is available at the output of a second logic gate 80 which is, e.g., an AND-gate and which receives the output signal of the flip-flop 35 and the error signal S39. In this circuit, a logic "1" of output signal Sout represents a switch-on level, while a logic "0" represents switch-off level, a logic "0" of the error signal S39 represents an error. The output signal Sout assumes the switch-on level only when both of its input signals have a logic "1", i.e. when the flip-flop 35 signals that the output signal should assume a switch-on level and when there is no error.

Figure 15:
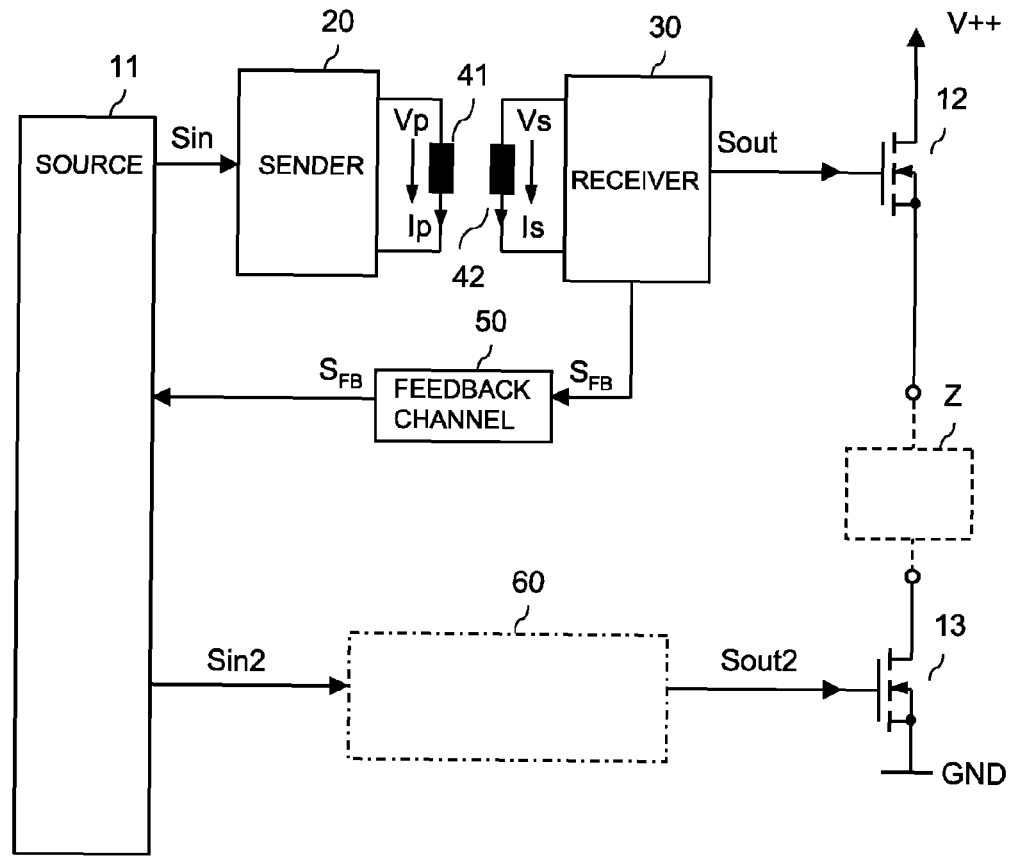
FIG. 15 schematically illustrates a further embodiment of a signal transmission arrangement.

A further embodiment of a signal transmission arrangement is illustrated in FIG. 15. In this signal transmission arrangement, the feedback signal $S_{FB}$ additionally or alternatively to the sender circuit 20 is also provided to the signal source 11. Referring to the explanation provided hereinabove, the signal source generates the data input signal Sin provided to the sender circuit 20 and transmitted to the data sink 12. In the embodiment of FIG. 15, the data sink 12 is a first switching element, like a MOSFET, for switching an electrical load Z (illustrated in dashed lines) connected in series with the first switching element 12. The first switching element 12 is switched on and off dependent on the data input signal Sin provided by the signal source 11.

In this embodiment, the data input signal is a switching signal which governs the switching state (on or off) of the first switching element. According to one embodiment, the data input signal Sin assumes an on-level when the first switching element 12 is to be switched on, and assumes an off-level when the first switching element 12 is to be switched off. The sender circuit 20 generates drive signal pulses Sp which are dependent on the data input signal and which are transmitted via the channel 40 with the transformer to the receiver circuit 30. The receiver circuit 30 receives the transmitted drive pulses and generates the receiver output signal Sout dependent on the transmitted drive pulses. The receiver output signal Sout acts as drive signal which switches the first switching element on or off.

According to one embodiment, the sender circuit 20 is configured to generate a first sequence of signal pulses in response to a given first edge of the switching signal Sin. The first edge is, for example, an edge of the switching signal Sin which indicates that the first switching element 12 is to be switched on. According to one embodiment, the first edge is a rising edge of the switching signal.

According to one embodiment, the first sequence includes a given number of signal pulses that are transmitted via the channel with the transformer and that are transmitted within a given time frame. The receiver circuit is, for example, configured to generate an on-level of the drive signal Sout upon receipt of the first signal pulse. Due to transmission errors, signal pulses of the first sequence can "get lost" during the transmission.

The circuit arrangement of FIG. 15 includes a second switching element 13 which is also controlled by the signal source 11 and which can be switched on and off by the signal source 11 via a second switching signal Sin2. The second switching signal Sin2 is either directly provided to a control terminal of the second switching element 13 or is transmitted to the control terminal of the second switching element 13 via an optional transmission arrangement 60. This transmission arrangement can be implemented with a sender, like sender 20, a receiver, like receiver 30, and a channel, like the channel 40 with the transformer, but could also be implemented in a different way.

The second switching element 13 is also connected in series with the load Z, wherein a series circuit with the two switching elements 12, 13 and the load is connected between voltage supply terminals V++, GND. The signal source 11 is configured to switch the second switching element 13 off in order to switch off the load Z, when a transmission error in the transmission path between the signal source 11 and the first switching element 12 has been detected. A transmission error can be detected in different ways: According to a first embodiment, the receiver circuit 30 is configured to count the signal pulses received within a given time frame and is configured to transmit an error signal via the feedback channel 50 to the signal source 11, when less than the expected number of signal pulses have been received. According to a second embodiment, the receiver circuit 30 is configured to transmit an acknowledge signal to the signal source 11 via the feedback channel 50 each time a signal pulse is received. In this embodiment, the signal source, by counting the acknowledge signals, evaluates if less than the given number of signal pulses have been received at the receiver circuit.

It should be noted, that the two switching elements 12, 13 can be switching elements of a full-bridge-circuit, wherein in FIG. 15 the other switches of the full-bridge circuit are not illustrated. The two switching elements 12, 13 can also be switches of a half-bridge-circuit. In this case, the load can be connected between the two switches, as illustrated in FIG. 15. Alternatively, in a half-bridge circuit the load can be connected between an output of the half-bridge (which is usually a terminal that is common to the first and second switching elements 12, 13) and a further terminal.

Besides switching off the second switching element 13, when a transmission error is detected, additionally the signal transmission parameters, like amplitude, slope or pulsewidth of the transmitted signal pulses or the gain of an amplifier in the receiver circuit 30 can be adjusted.

In the embodiments explained with reference to FIGS. 1 to 13, the drive signal parameters are generated dependent on a feedback signal received by the sender circuit 20 via a feedback signal $S_{FB}$. According to a further embodiment illustrated in FIG. 16, the drive signal parameters are adjusted dependent on a feedback signal $S_{FB}$ provided by another signal source than the receiver circuit 30. The drive signal parameters adjusted by the feedback signal are, for example, the amplitude, slope or pulsewidth of drive signals generated by the sender circuit 20 dependent on the data input signal Sin.

Figure 16:
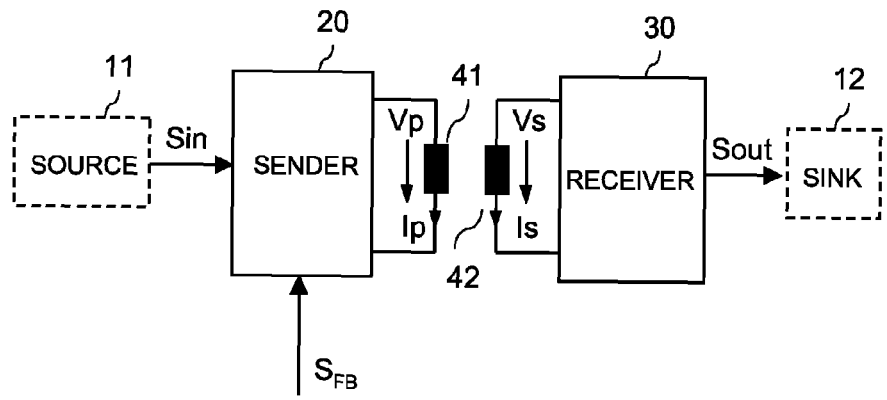
FIG. 16 schematically illustrates yet another embodiment of a signal transmission arrangement.

According to one embodiment, the circuit of FIG. 16 is implemented in a circuit (not shown) with at least two switching elements, wherein a first one of these switching elements is controlled by the receiver circuit 30. In this embodiment, the feedback signal $S_{FB}$ is generated dependent on the drive signal of a second one of these switching elements, wherein according to one embodiment, the feedback signal is generated such that each time before the second switching element is switched on or off, the drive signal generation parameters are adjusted such that the signal transmission becomes more robust, in order to prevent noise or EMI which is associated with the switching of the second switching element from corrupting the signal transmission.

Finally it should be mentioned that features which have been explained in connection with one embodiment can be combined with features of each of the other embodiments even if this is not explicitly stated hereinbefore.

What is claimed is:

1. A signal transmission arrangement, comprising:
a sender circuit comprising a first input for receiving a data input signal, an output for providing a drive signal, and a second input, wherein the output of the sender circuit is connected to a primary winding of a transformer of a first transmission channel;
and
a receiver circuit comprising a receiver input connected to a secondary winding of the transformer, a first output for providing a data output signal, and a second output;

wherein the sender circuit is configured to generate the drive signal dependent on the data input signal and dependent on at least one drive signal generation parameter, wherein the sender circuit is configured to adjust the at least one drive signal generation parameter dependent on a feedback signal received at the second input, wherein the receiver circuit is configured to evaluate a signal level at the receiver input and to detect a signal transmission when the signal level reaches a given threshold, and wherein the receiver circuit is configured to generate the feedback signal dependent on the detection of the signal transmission.

2. The signal transmission arrangement of claim 1, further comprising:

a second transmission channel connected between the second output of the receiver circuit and the second input of the sender circuit;

wherein the receiver circuit is configured to transmit the feedback signal via the second transmission channel to the sender circuit.

3. The signal transmission arrangement of claim 1, wherein the transformer comprises a coreless transformer.

4. The signal transmission arrangement of claim 2, wherein the second transmission channel comprises one of a second transformer, a level-shifter, or an optocoupler.

5. The signal transmission arrangement of claim 2, wherein the receiver circuit is configured to generate the feedback signal dependent further on at least one of the following parameters: a temperature at the receiver circuit, a supply voltage of the receiver circuit, and/or a signal transmission error rate.

6. The signal transmission arrangement of claim 1, wherein the sender circuit is configured to detect first edges in the data input signal and, upon detection of a first slope, to generate a signal pulse of the drive signal with a rising first edge and a falling second edge, wherein a slew rate of the first edge is different from a slew rate of the second edge.

7. The signal transmission arrangement of claim 6, wherein an amplitude of the signal pulse is dependent on the feedback signal.

8. The signal transmission arrangement of claim 6, wherein a lower slew rate of the slew rates of the first and second edges is dependent on the feedback signal.

9. The signal transmission arrangement of claim 1, wherein the sender circuit is configured to detect first slopes in the data input signal and, upon detection of a first slope, to generate a signal pulse of the drive signal, the signal pulse having an amplitude and a duration.

10. The signal transmission arrangement of claim 9, wherein at least one of the amplitude and the duration of the signal pulse is dependent on the feedback signal.

11. The signal transmission arrangement of claim 1, where the signal transmission arrangement is configured to assume a normal mode or a calibration mode, wherein in the calibration mode the sender circuit is configured to generate a sequence of drive pulses with different drive signal generation parameters, the receiver circuit is configured to generate at least one signal pulse of the feedback signal when a signal pulse is detected, and the sender circuit is configured to store the drive signal generation parameters when the signal pulse is received at the second input.

12. The signal transmission arrangement of claim 11, wherein the signal transmission arrangement enters the calibration mode at power up.

13. The signal transmission arrangement of claim 2, wherein the receiver circuit includes an error detection circuit that is configured to detect an error state in the receiver circuit, wherein the receiver circuit is configured to transmit an error message to the sender circuit via the second transmission channel when the error state has been detected, and wherein the sender circuit is configured to repeat a latest signal pulse upon receipt of the error message.

14. A signal transmission method, comprising:

providing a signal transmission arrangement with a first transmission channel connected between a sender circuit and a receiver circuit and comprising a transformer;

detecting a signal transmission via the first transmission channel at the receiver circuit, wherein the detecting the signal transmission comprises evaluating a signal level at a first input of the receiver circuit and detecting the signal transmission when the signal level reaches a given threshold;

generating a feedback signal dependent on the detection of the signal transmission;

receiving a data input signal at the sender circuit and generating a drive signal at the first transmission channel which is dependent on the data input signal and which is dependent on a drive signal generation parameter; and adjusting the drive signal generation parameter dependent on the feedback signal.

15. The method of claim 14, further comprising:

providing a second transmission channel connected between the sender circuit and the receiver circuit; and transmitting the feedback signal via the second transmission channel from the receiver circuit to the sender circuit.

16. The method of claim 14, wherein the transformer comprises a coreless transformer.

17. The method of claim 15, wherein the second transmission channel comprises one of a second transformer, a level-shifter, or an optocoupler.

18. The method of claim 15, wherein the feedback signal is dependent on at least one of the following parameters: a temperature at the receiver circuit, a supply voltage of the receiver circuit, and/or a signal transmission error rate.

19. The method of claim 14, further comprising:

detecting first slopes in the data input signal; and upon detection of a first slope, generating a signal pulse at the first transmission channel with a rising first edge and a falling second edge, wherein a slew rate of one of the first and second edges is higher than a slew rate of another one of the first and second edges.

20. The method of claim 19, wherein at least one of the following parameters is dependent on the feedback signal: an amplitude of the signal pulse and/or a lower slew rate of the slew rates of the first and second edges.

21. The method of claim 14, further comprising:

detecting first slopes in the data input signal; and, upon detection of a first slope, generating a signal pulse of the drive signal, the signal pulse having an amplitude and a duration.

22. The method of claim 21, wherein at least one of the amplitude and/or the duration of the signal pulse is dependent on the feedback signal.

23. The method of claim 14, wherein the receiving and adjusting steps are performed in a normal mode or a calibration mode, wherein in the calibration mode a sequence of drive pulses with different drive signal generation parameters are generated at the first transmission channel, at least one signal pulse of the feedback signal is generated when a signal pulse is detected at the receiver circuit, and wherein the drive signal generation parameters are stored when the signal pulse is received at a second input.

24. The method of claim 15, further comprising:

detecting an error state in the receiver circuit;

transmitting an error message to the sender circuit via the second transmission channel when the error state has been detected; and repeating a latest signal pulse upon receipt of the error message.

25. A circuit arrangement, comprising:

a signal transmission arrangement comprising:
- a sender circuit comprising a first input for receiving a data input signal, an output for providing a first drive signal, and a second input, a first transmission channel with a transformer, the transformer comprising a primary winding connected to the output of the sender circuit and a secondary winding,
- a receiver circuit comprising an input connected to the secondary winding, a first output for providing a data output signal, and a second output, wherein the sender circuit is configured to generate the drive signal dependent on the data input signal and dependent on at least one drive signal generation parameter, and the sender circuit is configured to adjust the at least one drive signal generation parameter dependent on a feedback signal received at the second input, and the feedback signal is generated based on the first drive signal,
- a first switching element controlled by the receiver circuit, and
- a second switching element coupled to the first switching element, wherein the second switching element has an input responsive to a second drive signal generated by a second sender circuit.

26. A signal transmission arrangement, comprising:

a sender circuit comprising a first input for receiving a data input signal, an output for providing a drive signal, and a second input, wherein the sender circuit is coupled to a receiver circuit via a first transmission channel;

wherein the sender circuit is configured to generate the drive signal dependent on the data input signal and dependent on at least one drive signal generation parameter, wherein the sender circuit is configured to adjust the at least one drive signal generation parameter dependent on a feedback signal received at the second input from the receiver circuit, and wherein the sender circuit is configured to detect first edges in the data input signal and, upon detection of a first slope, to generate a signal pulse of the drive signal with a rising first edge and a falling second edge, wherein a slew rate of the first edge is different from a slew rate of the second edge.

27. The signal transmission arrangement of claim 26, wherein an amplitude of the signal pulse is dependent on the feedback signal.

28. The signal transmission arrangement of claim 26, further comprising the first transmission channel, wherein the first transmission channel comprises a transformer.

29. The signal transmission arrangement of claim 26, further comprising the receive circuit, wherein the receive circuit is configured to generate the feedback signal dependent on a detection of a signal transmission from the sender circuit.

* * * * *